Sept. 24, 1968  M. PARKER  3,402,615
INTERMITTENT DRIVING MECHANISM
Filed April 4, 1966  5 Sheets-Sheet 2

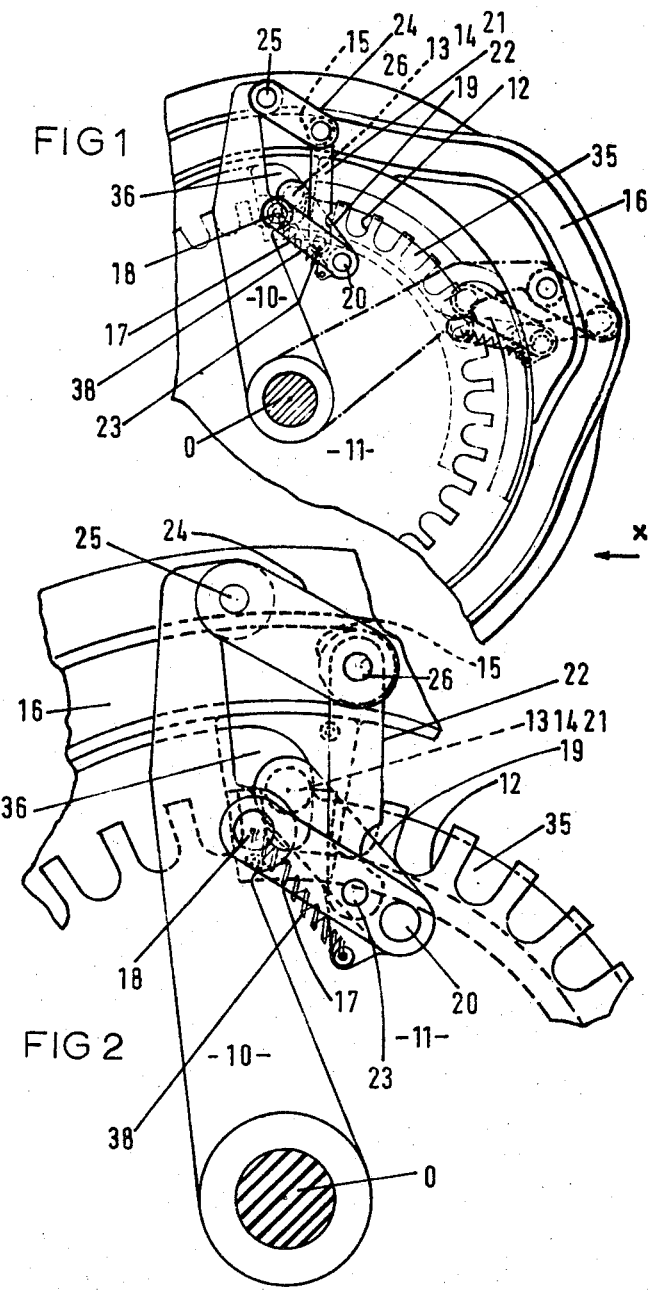

INVENTOR
MATTHEW PARKER
Norris & Bateman
ATTORNEYS

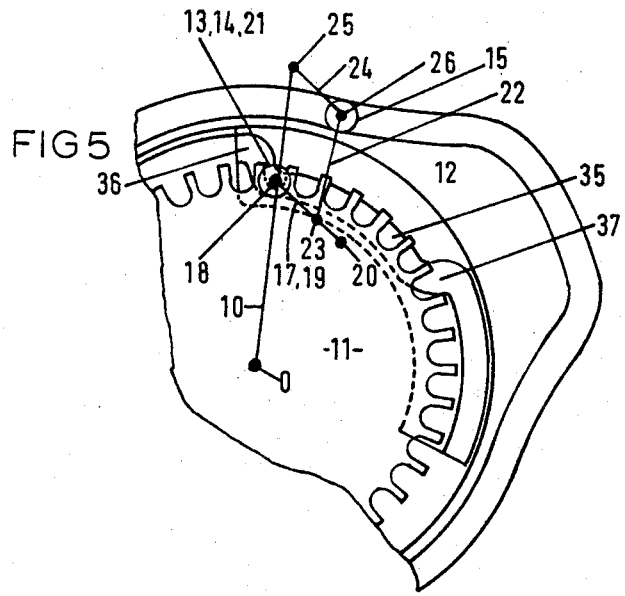
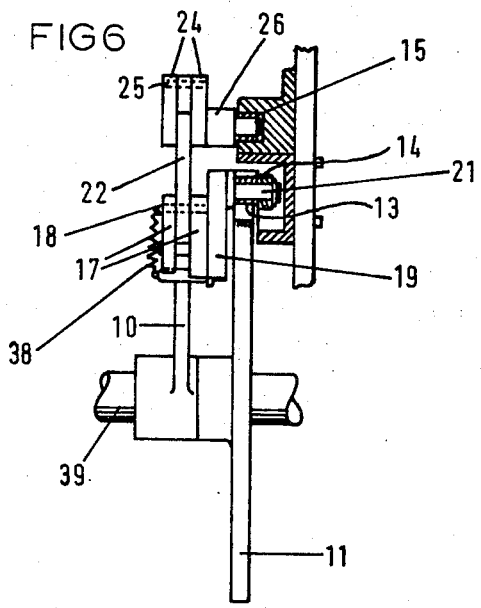

Sept. 24, 1968     M. PARKER     3,402,615
INTERMITTENT DRIVING MECHANISM
Filed April 4, 1966     5 Sheets-Sheet 5
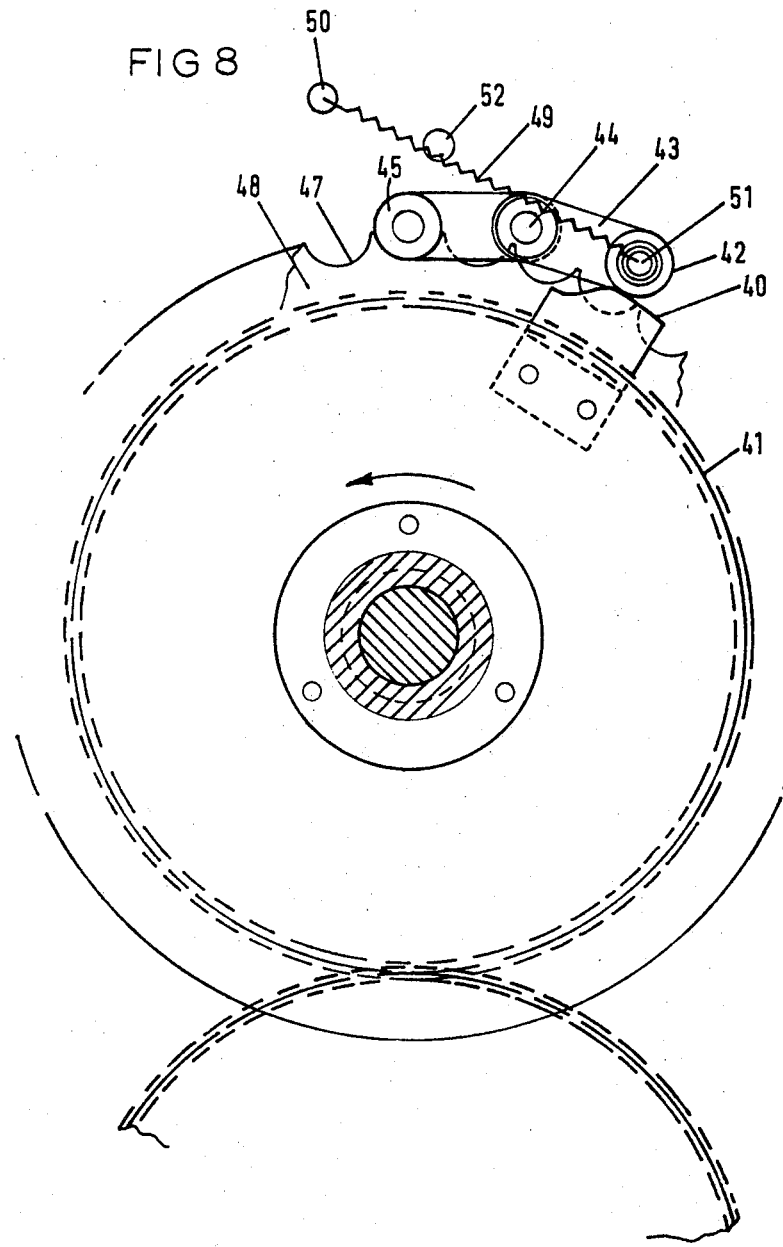
INVENTOR
MATTHEW PARKER
Norris & Bateman
ATTORNEYS United States Patent Office 3,402,615
Patented Sept. 24, 1968

3,402,615
INTERMITTENT DRIVING MECHANISM
Matthew Parker, Leeds, England, assignor to Formmaster Limited, Petersborough, England, a British company
Filed Apr. 4, 1966, Ser. No. 539,759
Claims priority, application Great Britain, Apr. 12, 1965, 15,532/65
12 Claims. (Cl. 74—125.5)

ABSTRACT OF THE DISCLOSURE

An intermittent driving mechanism comprises a continuously rotating driving member selectively periodically connected to rotate a coaxial driven member having a slotted periphery by a cam controlled system of pivoted links, and a cam operated lock for the driven member is provided for insuring proper registration of the driven member and the linkage at each drive period.

---

This invention relates to intermittent driving mechanisms.

It is often a requirement that intermittently moving parts of a machine should be started and stopped as nearly instantaneously as possible. Where the moving parts are light and do not travel at high speed, an appropriate instantaneous action can be secured by, for example, the use of a toothed clutch. When, however, the speed and weight of the intermittently moving parts are at all significant, provision must be made to reduce the concussion noise and vibration which result from the excessively high acceleration and deceleration arising from abrupt coupling and uncoupling of the drive. Even a small amount of time allowed for acceleration and deceleration brings about a considerable improvement and the principal object of the invention is to provide such time.

The invention provides an intermittent driving mechanism comprising a continuously rotatable driving member, a circular driven member which is rotatable about an axis near to or coincident with the axis of rotation of the driving member and has a number of radial slots in its periphery, means adapted to couple intermittently the driven member to the driving member and comprising:

(a) A first link pivotally mounted on the driving member
(b) A second link pivotally connected to the first link
(c) A first runner mounted on the second link and engageable with and disengageable from the slots in the driven member to initiate and stop rotation of the driven member.
(d) A second runner
(e) A primary cam coacting with the second runner to control the coaction of the first runner and driven member slots, and retaining means operative to retain the driven member, upon termination of the drive, with one of its slots in alignment with the slot entry position of the first runner.

One embodiment of the invention will now be described with reference to the accompanying drawing, in which—

FIG. 1 is a front elevation of a sufficient part of the mechanism for an understanding of the invention.

FIG. 2 is a similar view to FIG. 1 but on an enlarged scale.

FIGS. 3, 4 and 5 show diagrammatically three successive stages of operation of the mechanism.

FIG. 6 is a side view looking in the direction of the arrow X of FIG. 1.

FIG. 8 is a section on the line Y—Y in FIG. 7.

Figure 3:
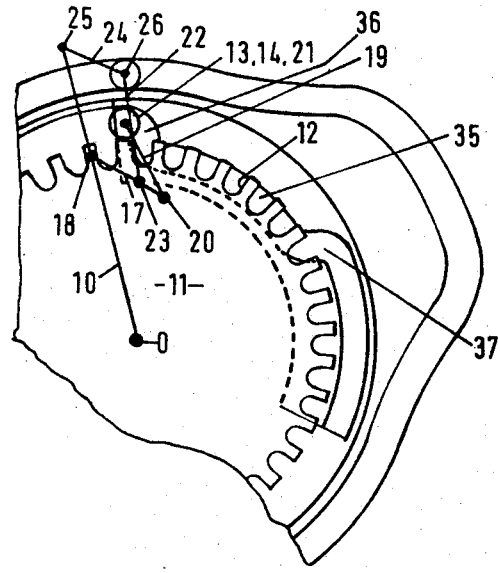

Referring initially to FIGS. 1 to 6 the mechanism includes a driving arm which is continuously rotated, preferably at constant speed although this is not essential, in a clockwise direction about a centre O, and a driven disc 11 which is rotatable about the centre O and has 36 equidistant radial slots 12 in its periphery. The mechanism also includes three runners, viz.

(a) A runner 13 which engages one of the slots 12 during part only of the 360° rotation of the arm 10 to impart rotation to the driven disc 11.

(b) A runner 14 which coacts with a primary cam 35 to effect engagement with and disengagement of the runner 13 from the slots 12, and (c) A control runner 15 which coacts with a control cam 16.

The three runners are connected to the driving arm 10 by a linkage consisting of:

(i) A leading link 17 pivoted at 18 at one end of the link to the arm 10 so that the other end of the link leads the arm 10 leading link with a trailing end of the trailing link.

(ii) A trailing link 19 of equal length to the leading link 17 and pivoted at 20 at one end of this link to the leading end of the link 17 carrying a stud 21 on which are mounted the runners 13 and 14.

(iii) A control link 22 pivoted at 23 to the leading link 17 and (iv) A connecting link 24 pivoted at 25 to the arm 10 and at 26 to the control link 22.

The stud 26 at the point of connection of the links 24 and 22 carries the runner 15 which is effective, by coaction with the control cam 16, to oscillate the link 17 about the pivot 18.

The drive is initiated by entrance of the runner 14 into a lead-in portion 36 of the primary cam 35 and continues while the runner 14 traverses an actuate main portion of the cam which is struck from the centre O and terminates when the runner 14 moves into a lead-out portion 37 of the cam.

Figure 4:
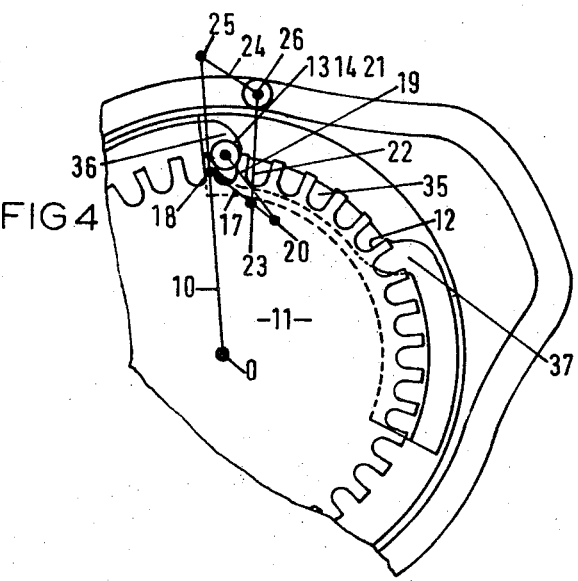

In FIG. 3 the runner 14 is shown above to enter the lead-in cam portion 36 to initiate the transfer of the drive to the driven disc 11. During this stage the trailing link 19 moves from a position essentially inclined to the link 17 towards the latter. In FIGS. 1 and 2 and 4 the runner 14 is shown about to pass from the lead-in cam portion 36 to the main circular portion 35 of the primary cam and the runner 13 is shown about to enter a slot 12 in the driven disc 11. As the arm 10 moves from the position shown, the runner 13 is constrained by the shape of the lead-in cam track to move in a circular arc about a centre referred to as the lead-in centre which is located on a line which is tangential to the disc 11 at the entrance to the particular slot 12 about to receive the runner 13 and therefore at 90° to the centre line of this slot. Accordingly the runner 13 enters the slot in similar fashion to the driving pin of a Geneva mechanism having an extremely short driving arm turning about the said lead-in centre.

Resemblance to Geneva action ceases when the cam path 35 becomes circular about the centre O at the junction of the arc about the lead-in centre with a line drawn from the lead-in centre to the driving arm centre O. The centre line of the cam path 35 now has the same radius as the pivot 18 about centre O and as the leading and trailing links 17 and 19 are of equal length, they are in line with each other when the stud 21 reaches the aforesaid junction.

While the pivot 18 has been rotating uniformly through 10° about the centre O from the position shown in FIGS. 1, 2 and 4 to the point shown in FIG. 5 the slot 12 has been accelerated from rest at the position shown in the former figures during rotation through 5° about the centre O to the position shown in the latter figure at which its speed is equal to that of the stud 18.

Momentarily and at the position shown in FIGS. 1, 2 and 4, the stud 21 has no rotation about the centre O and its speed of rotation about O does not reach that of the pivot 18 until it is in line with the latter, its average speed being half that of pivot 18 since 21 has moved only 5° round O whilst 18 has moved 10°. In other words, in order to accelerate the disc 11 from rest up to the speed of the arm 10 the stud 21 has had to move 5° backwards relative to the arm.

During disengagement the stud 21 must again move backwards relatively to the arm as its average speed about O must be less than that of the pivot 18 as the disc 11 is being brought to rest. This further backward movement is made possible by oscillation, by the control cam 16 of the links 17 and 19 about the pivot 18 so that before deceleration begins at the junction of the arcuate centre lines of the main cam path 35 and the leading part of the lead-out cam path 37, with the pivot 18 and stud 21 still in line, the leading link 17 is progressively angularly displaced relative to the arm 10 to the position shown in chain-dotted lines in FIG. 1.

If it is required that the oscillation of links 17 and 19 should not affect the motion of the disc 11 the stud 21 must remain in line with the pivot 18 throughout the oscillation. The arm 10 and the disc 11 are kept exactly in step between the acceleration and deceleration periods by virtue of the alignment of pivot 18 and stud 21 while preparing the links 17 and 19 for deceleration.

The action of the lead-out cam path 37 during deceleration is very similar to that (already described) during acceleration and the chain-dotted position of the link 19 shows that the cam path 37 has momentarily arrested motion of the runner 13 around O and that the disc 11 has just been brought to rest at this point. Deceleration began when the pivot 18 and stud 21 reached the junction of the centre lines of the cam paths 35 and 37 and it is evident that while the stud 18 and the arm 10 moved through 10° from the said junction about centre O the stud 21 and the disc 11 moved through 5° only from this junction.

As the result of disengagement of the drive, another of the slots 12 is brought into alignment with the lead-in portion 36 of the cam ready for resumption of the drive at the appropriate point in the next revolution of the arm 10. To ensure that the disc 11 will not move, a before drive resumption cam operated lock, described below, is provided to hold the disc during the dwell period.

The cam path 35 could be complete, i.e. in the example shown, the high dwell of the cam path would extend throughout the missing 240° and at any time during transversal of the high dwell by the runner 14 the cam path 16 may cause the link 17 to turn about the pivot 18 to its original position, in readiness for the runner 13 to enter another slot 12 and thus start the next cycle. This, however, would limit the rotation of the disc 11 per cycle to a fixed amount, and it is a particularly useful feature of the mechanism illustrated that the rotation of the disc may be varied by providing a number of positions (in this case at 10° intervals) to which the accelerating lead-in portion of the cam can be moved.

The lead-in portion 36 of the cam 35 is accordingly movable in relation to the rest of the cam. It is shown set in its extreme clockwise position in which it abuts the fixed section 35 of the cam and gives minimum rotation (60° per cycle) to the disc 11. Maximum rotation may be as much as 300° by setting the movable portion 36 24 slot pitches counter-clockwise from the position shown. The runner 13 must remain disengaged from the disc 11 long enough to allow the control cam path 16 to return the link 17 to the starting position as described above, and when the disc rotates through no more than 300° it has sufficient time at rest for return of the link 17 to take place.

If it is desirable to vary the rotation of the disc 11 whilst the machine is running, the movable portion 36 of the cam may be attached to a cam operated mechanism, so that it can be repositioned thereby in time to produce the required variation.

The runner 14 may be positively controlled when it is disengaged from the cam path 35, 36 and 37. The path between cam portions 36 and 37 can be varied and so will require that the arcs actually forming portions 36 and 37 may be of the other shape provided the mentioned obliquity is limited. In the case illustrated, non-positive control is provided by a light spring 38 connecting a lug on the trailing link 19 to the pivot 18 and tending to hold a stop on the link 19 against the leading link 17 in the fully disengaged position.

The circular arcs joining the lead-out cam portion 37 to the lead-in cam portion 36 may, if more convenient, be of other shape, provided that the runner 13 is guided with little obliquity into and out of slots 12 at the moment of entry and departure, i.e. at the position of runner 13 shown respectively in full and in chain-dotted lines in FIG. 1.

Provided the slots 12 are of suitable length, the time for accelerating and decelerating the disc 11 need not be limited to a very small amount. Thus if the low dwell of the cam path 35 in the described example, were reduced in radius and length, and the circular arcs of the lead-in and lead-out portions at each end were modified to join on smoothly, then the acceleration and deceleration periods would be prolonged, the stud 18 being repositioned opposite the new low radius centre line of the cam path 35.

The control cam 16 can, as an alternative, be positioned to coact with a runner on an extension of the pivot 20 of the linkage, in which case the links 22 and 24 can be omitted. The arm 10 may be driven by a gear attached to it and may be freely rotatable on a shaft 39 having the axis O, and the driven disc 11 may be keyed to the shaft so that the latter transmits intermittent motion to a driven mechanism.

Figure 7:
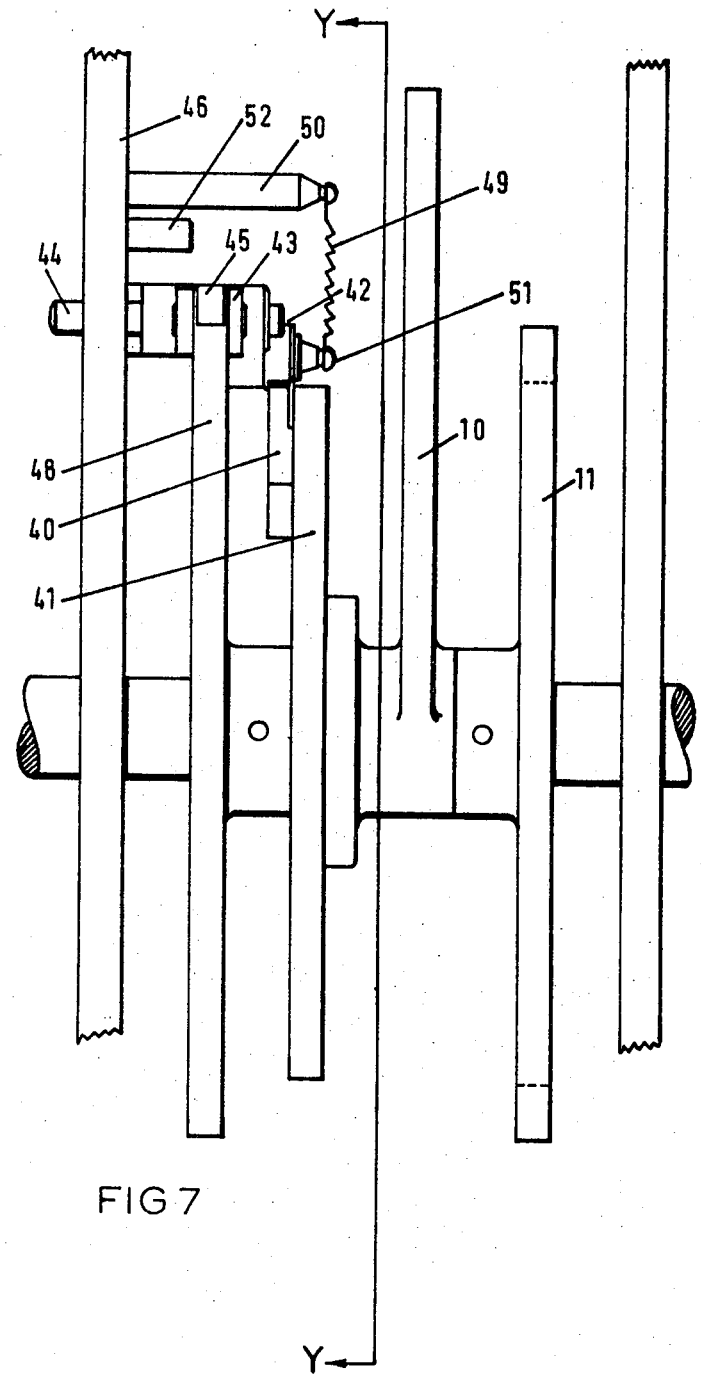
FIG. 7 is a side elevation showing a locking mechanism.

Referring now to FIGS. 7 and 8, the above-described cam-lock includes a cam-piece 40 fixed to the driving gear 41 of arm 10 coacting with a runner 42 on a lever 43 pivoted at 44 to the machine framework 46 and carrying, in a forked extremity, a second runner 45 locking into one of 36 equidistant recesses 47 in a sprocket-like locking member 48 pinned to the shaft drive of the disc 11.

At the position shown, the drive of the disc 11 has just disengaged, leaving the disc positively held by the runner 45 but shortly after, as the cam-piece 40 moves clear of the runner 42, the disc is held nonpositively under the control of a spring 49 connecting a part 50 on the frame 46 to the pin 51 carrying the runner 42, so as to tend to keep the runner 45 engaged with the recess 47 in the member 48 by applying a counter-clockwise turning moment to the lever 43. Whenever the drive re-engages the disc 11 at any point within the range of adjustment, the non-positive hold of the runner 45 is overcome and the lever 43 is pushed against a stop 52, where it is retained by the spring 49 which now, having passed over the "dead-centre" position, exerts a clockwise moment on the lever 43. The disc 11 always stops at the same time, therefore the cam-piece 40 does not need to be adjusted. The lever 43 stays against the stop 52 until the cam-piece 40 initiates the next locking cycle.

The mechanism described can be used for driving an intermittent paper feed in a wrapping or printing machine. It is useful for many purposes when a constant or nearly constant speed is required during the driven portion of an intermittent drive.

I claim:
1. An intermittent driving mechanism comprising a continuously rotatable driving member, a circular driven member which is rotatable about an axis near to or coincident with the axis of rotation of the driving member and has a number of radial slots in its periphery, means adapted to couple intermittently the driven member to the driving member and comprising:

(a) a first link pivotally mounted on the driving member
(b) a second link pivotally connected to the first link
(c) a first runner mounted on the second link and engageable with and disengageable from the slots in the driven member to initiate and stop rotation of the driven member
(d) a second runner
(e) a primary cam coacting with the second runner to control the coaction of the first runner and driven member slots and retaining means operative to retain the driven member, upon termination of the drive, with one of its slots in alignment with the slot entry position of the first runner.

2. An intermittent driving mechanism according to claim 1 wherein the first link leads the driving member and the second link trails its pivotal connection to a leading end of the first link.

3. An intermittent driving mechanism according to claim 2 wherein the first and second runners are mounted in coaxial alignment at a trailing end of the second link.

4. An intermittent driving mechanism according to claim 2 wherein the first and second links are of equal length.

5. An intermittent driving mechanism according to claim 1 comprising a control runner coacting with a control cam to angularly displace the first link so as to prepare the first and second links for disengagement of the first runner from a slot.

6. An intermittent driving mechanism according to claim 5 comprising a control link pivotally connected at a first end to the first link, a connecting link pivotally connected at a first end to the driving member and at a second end to a second end of the control link, the control runner being pivotally mounted on the control and/or connecting link.

7. An intermittent driving mechanism according to claim 1 comprising a spring serving to preserve a given relative position of the first and second links when the first runner is disengaged from a slot.

8. An intermittent driving member according to claim 1 wherein the primary cam comprises lead-in and lead-out portions connecting a high dwell between the latter and former to a low dwell between the former and latter via paths of small obliquity to respective slots.

9. An intermittent driving member according to claim 8 wherein at least one of the cam portions is movable to permit adjustment of the driven period in each revolution of the driving member.

10. An intermittent driving mechanism according to claim 1 wherein the retaining means comprises a lever mounted roller operative during non-driving of the driven wheel to engage a peripherally recessed wheel connected to or forming part of the driven wheel.

11. An intermittent driving mechanism according to claim 10 comprising a spring operative to provide nonpositive alternative location of the roller in and out of engagement with the recessed wheel.

12. An intermittent driving mechanism according to claim 11 comprising a fixed cam rotatable with the driving member and operative to initiate movement of the lever to engage the roller and respective recess.

References Cited

FOREIGN PATENTS

| | | |
|---|---|---|
| 271,065 | 3/1914 | Germany. |
| 450,470 | 7/1936 | Great Britain. |
| 683,055 | 10/1939 | Germany. |

FRED C. MATTERN, JR., *Primary Examiner.*

W. S. RATLIFF, *Assistant Examiner.*